(12) United States Patent
Kang et al.

(10) Patent No.: US 10,572,709 B2
(45) Date of Patent: Feb. 25, 2020

(54) TOUCH DRIVE CIRCUIT, TOUCH DISPLAY DEVICE, AND METHOD FOR DRIVING TOUCH DISPLAY DEVICE

(71) Applicant: LG DISPLAY CO., LTD., Seoul (KR)

(72) Inventors: Seongkyu Kang, Uijeongbu-si (KR); HongChul Kim, Anyang-si (KR); YoungJoon Lee, Goyang-si (KR); SungYub Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 110 days.

(21) Appl. No.: 15/705,965

(22) Filed: Sep. 15, 2017

(65) Prior Publication Data

US 2018/0089487 A1    Mar. 29, 2018

(30) Foreign Application Priority Data

Sep. 23, 2016 (KR) .................... 10-2016-0121975

(51) Int. Cl.
*G06K 9/00* (2006.01)
*G06F 3/041* (2006.01)
*G06F 3/044* (2006.01)

(52) U.S. Cl.
CPC .......... *G06K 9/0002* (2013.01); *G06F 3/044* (2013.01); *G06F 3/0412* (2013.01); *G06F 3/0416* (2013.01)

(58) Field of Classification Search
CPC ...... G06F 3/0412; G06F 3/044; G06F 3/0416; G06F 9/0002
See application file for complete search history.

(56) References Cited

U.S. PATENT DOCUMENTS

| | | | |
|---|---|---|---|
| 2016/0334934 A1* | 11/2016 | Mo | G02F 1/13338 |
| 2017/0038866 A1* | 2/2017 | Akhavan Fomani | G06F 3/044 |
| 2017/0220194 A1* | 8/2017 | Wu | G06F 3/042 |
| 2017/0269440 A1* | 9/2017 | Yoshitomi | G02F 1/134309 |

* cited by examiner

*Primary Examiner* — Christopher E Leiby
(74) *Attorney, Agent, or Firm* — Morgan, Lewis & Bockius LLP

(57) ABSTRACT

A touch display device can sense a fingerprint touch using a pixel electrode and a data line. Before a capacitance variance of the pixel electrode in a fingerprint touch sensing interval is sensed, the voltage of only the data line is fixed to be identical to a voltage applied to a (+) terminal of an operational amplifier of a fingerprint touch sensing unit so that a capacitance variance of the data line is not transferred to the fingerprint touch sensing unit, and a capacitance variance of only the pixel electrode may be transferred. The capacitance variance of only the pixel electrode, not including the capacitance variance of the data line, is transferred to the fingerprint touch sensing unit so that the distinction between a peak and a valley of a fingerprint touching a display panel is enhanced. Therefore, a fingerprint touch sensing performance can be improved.

23 Claims, 11 Drawing Sheets

TOUCH DRIVE CIRCUIT, TOUCH DISPLAY DEVICE, AND METHOD FOR DRIVING TOUCH DISPLAY DEVICE

CROSS REFERENCE TO RELATED APPLICATION

This application claims priority from Korean Patent Application No. 10-2016-0121975, filed on Sep. 23, 2016, which is hereby incorporated by reference for all purposes as if fully set forth herein.

BACKGROUND

1. Technical Field

The present embodiments relate to a touch display device, a method for driving the same, and a touch drive circuit included in the touch display device.

2. Description of the Related Art

With the development of an information-oriented society, the demand for display devices for displaying images has increased in various forms, and various types of display devices, such as liquid crystal display devices, plasma display devices, and organic light-emitting display devices have been used.

Among the display devices, mobile devices such as smart phones and tablets, and medium and large-sized devices such as smart televisions provide touch-type input processing, depending on the user convenience and the device characteristics.

The display device capable of performing the touch-type input processing has been developed to provide a greater number and variety of functions, and user's demands have also diversified.

According to the various demands on the touch-type input processing, not only a method of sensing whether there is a user's touch on the display panel and sensing a touch position, but also a method of sensing a fingerprint of the user who touches the display panel and using the sensed fingerprint for input processing have been applied.

In order to sense the user's fingerprint and perform touch-type input processing, a step of analyzing the difference between a peak and a valley of the sensed fingerprint is required. However, there is a minute difference between a peak and a valley of a fingerprint, and it is thus difficult to precisely analyze the fingerprint.

Especially, when the data sensed during a fingerprint touch includes an unnecessary sensed value, the unnecessary value further degrades the distinction between the peak and valley and thereby degrades the performance of the fingerprint touch.

SUMMARY

Accordingly, embodiments of the present disclosure are directed to a touch drive circuit, a touch display device, and a method for driving a touch display device that substantially obviate one or more of the problems due to limitations and disadvantages of the related art.

An aspect of the present embodiments is to provide a touch display device which can not only sense whether there is a user's touch on a display panel, but also sense the user's fingerprint touch and use the sensed fingerprint touch for input processing, and a method for driving the touch display device.

An aspect of the present embodiments is to provide a touch display device which removes unnecessarily sensed data from data sensed during a user's fingerprint touch on a display panel, and thereby improves the distinction with respect to a fingerprint touch, and a method for driving the touch display device.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device comprises: a plurality of pixel electrodes disposed in a display panel; a data line disposed in the display panel and eletrically connected to the pixel electrodes; and a switching transistor disposed between a pixel electrode and the data line and connecting them to each other, wherein the touch display device senses a fingerprint touch by using change in capacitance between the pixel electrode and a user's finger.

In another aspect, a touch display device comprises: a voltage applying unit that applies forwarding voltage to the pixel electrode through the data line in a first interval in which the switching transistor is in an ON state within a fingerprint touch sensing interval, and applies reference voltage to the data line in a second interval in which the switching transistor is in an OFF state; and a fingerprint touch sensing unit that senses a capacitance variance of the pixel electrode in a third interval in which the switching transistor is in an ON state.

The voltage applying unit includes: a forwarding voltage control switch disposed between the data line and an input terminal for the forwarding voltage and connecting them to each other; and a reference voltage control switch disposed between the data line and an input terminal for the reference voltage and connecting them to each other.

The voltage applying unit controls such that: the forwarding voltage control switch is in an ON state and the reference voltage control switch is in an OFF state during the first interval within the fingerprint touch sensing interval; and the forwarding voltage control switch is in an OFF state and the reference voltage control switch is in an ON state during the second interval within the fingerprint touch sensing interval.

The fingerprint touch sensing unit includes: a sensing switch connected to the data line; an operational amplifier having an invert input (−) terminal connected to the sensing switch and a non-invert input (+) terminal to which the reference voltage is applied; and a capacitor connected to the operational amplifier in parallel.

The fingerprint touch sensing unit controls such that the sensing switch is in an OFF state in the first interval and the second interval within the fingerprint touch sensing interval and is in an ON state in the third interval within the fingerprint touch sensing interval.

In the ON state of the sensing switch, the operational amplifier senses a capacitance variance of the pixel electrode having a voltage level different from the reference voltage applied to the (+) terminal and stores the capacitance variance of the pixel electrode in the capacitor.

The fingerprint touch sensing unit may sense a fingerprint touch by using the capacitance variance of the pixel electrode, stored in the capacitor. Further, the fingerprint touch sensing unit may accumulate by a predetermined number of times a capacitance variance of the pixel electrode, which is sensed in the third interval within the fingerprint touch sensing interval, analyze a peak and a valley by using the accumulated capacitance variance, and sense a fingerprint touch.

Meanwhile, the touch display device may further include a common electrode disposed in the display panel and apply a voltage identical to the forwarding voltage to the common electrode in the first interval and the second interval within the fingerprint touch sensing interval.

In another aspect, a method for driving a touch display device comprises: during a first interval of a fingerprint touch sensing interval, turning on a switching transistor which is disposed between a data line and a pixel electrode and connects them to each other and applying forwarding voltage to the pixel electrode through the data line; during a second interval, turning off the switching transistor and applying reference voltage to the data line; and, during a third interval, turning on the switching transistor and sensing a capacitance variance of the pixel electrode.

The reference voltage applied to the data line in the second interval is identical to a voltage which is applied to a (+) terminal of an operational amplifier having a (−) terminal connected to the data line, in order to sense the capacitance variance of the pixel electrode in the third interval.

In another aspect, a touch drive circuit comprises: a forwarding voltage applying unit that applies forwarding voltage to a pixel electrode through a data line in a first interval in which a switching transistor disposed between the data line and the pixel electrode and connecting them to each other is in an ON state within a fingerprint touch sensing interval; a reference voltage applying unit that applies reference voltage to the data line in a second interval in which the switching transistor is in an OFF state within the fingerprint touch sensing interval; and a fingerprint touch sensing unit that senses a capacitance variance of the pixel electrode in a third interval in which the switching transistor is in an ON state within the fingerprint touch sensing interval.

According to the present embodiments, a capacitance variance of a pixel electrode disposed in a display panel is sensed through a data line, so that a fingerprint touch on the display panel can be sensed.

According to the present embodiments, when a capacitance variance of a pixel electrode is sensed in order to sense a fingerprint touch, the voltage of a data line is controlled to make the potentials of a (+) terminal and a (−) terminal of an operational amplifier be the same, whereby a capacitance variance formed by the data line can be removed from sensed data.

According to the present embodiments, when a fingerprint touch is sensed, a capacitance variance of a data line is removed from sensed data, so that a capacitance variance of only a pixel electrode can be sensed, and therefore the distinction with respect to a fingerprint touch can be improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
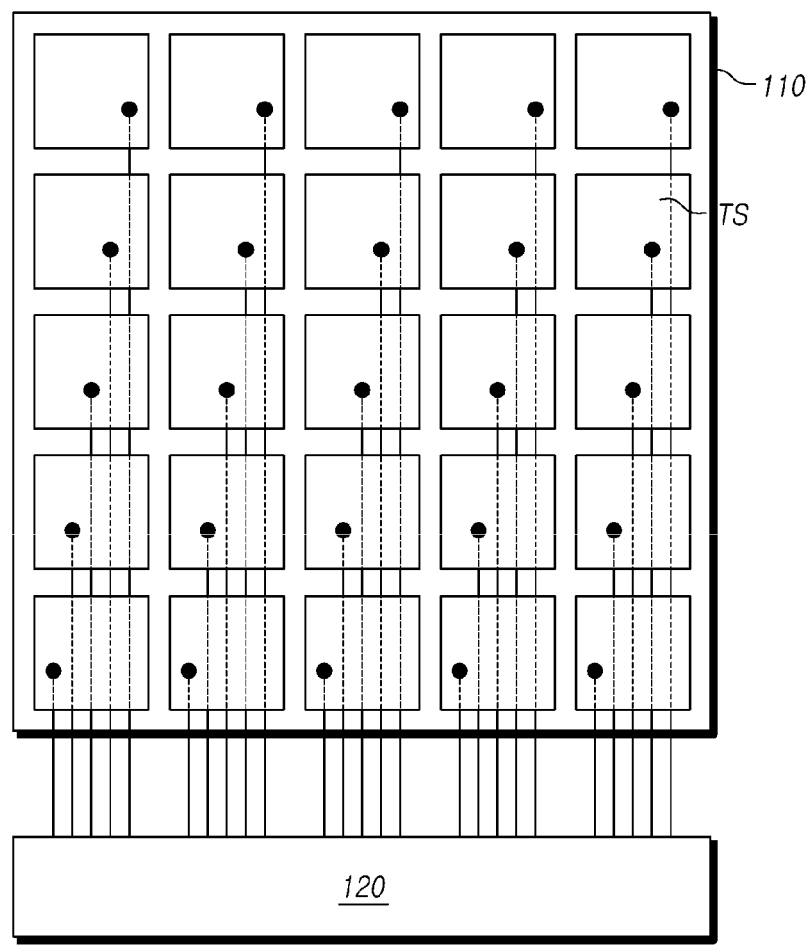
FIG. 1 is a schematic view illustrating a configuration of a touch display device according to the present embodiments.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one component from other components, and the property, order, sequence, number and the like of the corresponding component are not limited by the corresponding term. In the case that it is described that a certain structural element "is connected to", "is coupled to", or "is in contact with" another structural element, it should be interpreted that another structural element may "be interposed between" respective certain structural elements or the respective certain structural elements may "be connected", "be coupled", or "be in contact" through another structural element as well as that the certain structural element is directly connected to or is in direct contact with another structural element.

FIG. 1 is a schematic view illustrating a configuration of a touch display device 100 according to the present embodiments.

Referring to FIG. 1, a touch display device 100 according to the present embodiments includes: a plurality of touch electrodes (or touch sensors) disposed in a display panel 110; a touch drive circuit 120 that drives the touch electrodes; and touch wires that connect the touch electrodes and the touch drive circuit 120.

The touch electrodes are arranged while being separated from each other in the display panel 110. Each of the touch electrodes is connected to the touch drive circuit 120 through the touch wires.

A touch electrode may be a common electrode arranged in the display panel 110, may receive common voltage applied in an interval in which the display panel 110 operates in a display mode, and receive a touch drive signal applied in an interval in which the display panel 110 operates in a touch mode.

Therefore, since time division into a display driving interval and a touch drive interval is performed and a common electrode is used as a touch electrode, a user's touch on the display panel 110 can be sensed.

The touch drive circuit 120 applies a touch drive signal to the plurality of touch electrodes in the interval in which the display panel 110 operates in the touch mode.

When a touch drive signal is applied to the touch electrodes, and a user's touch on the display panel 110 occurs, a variance of capacitance between the user's finger, or the like and the touch electrode is sensed so as to sense whether there is a user's touch and sense a touch position (coordinate).

The touch display device 100 may use a common electrode as a touch electrode to sense a user's touch in the touch drive interval time-divided from the display driving interval. However, a touch electrode having the same size as that of a common electrode is insufficient to sense a fingerprint of a finger.

That is, in order to sense a fingerprint of a finger, a peak and a valley included in the fingerprint should be distinguished. Therefore, a difference in capacitance formed on a peak and a valley when a fingerprint touch is generated should be sensed.

According to this, in order to sense a user's fingerprint touch, the present embodiments provide a method for sensing the fingerprint touch by using pixel electrodes having a size smaller than a common electrode and arranged in the display panel 110.

Figure 2:
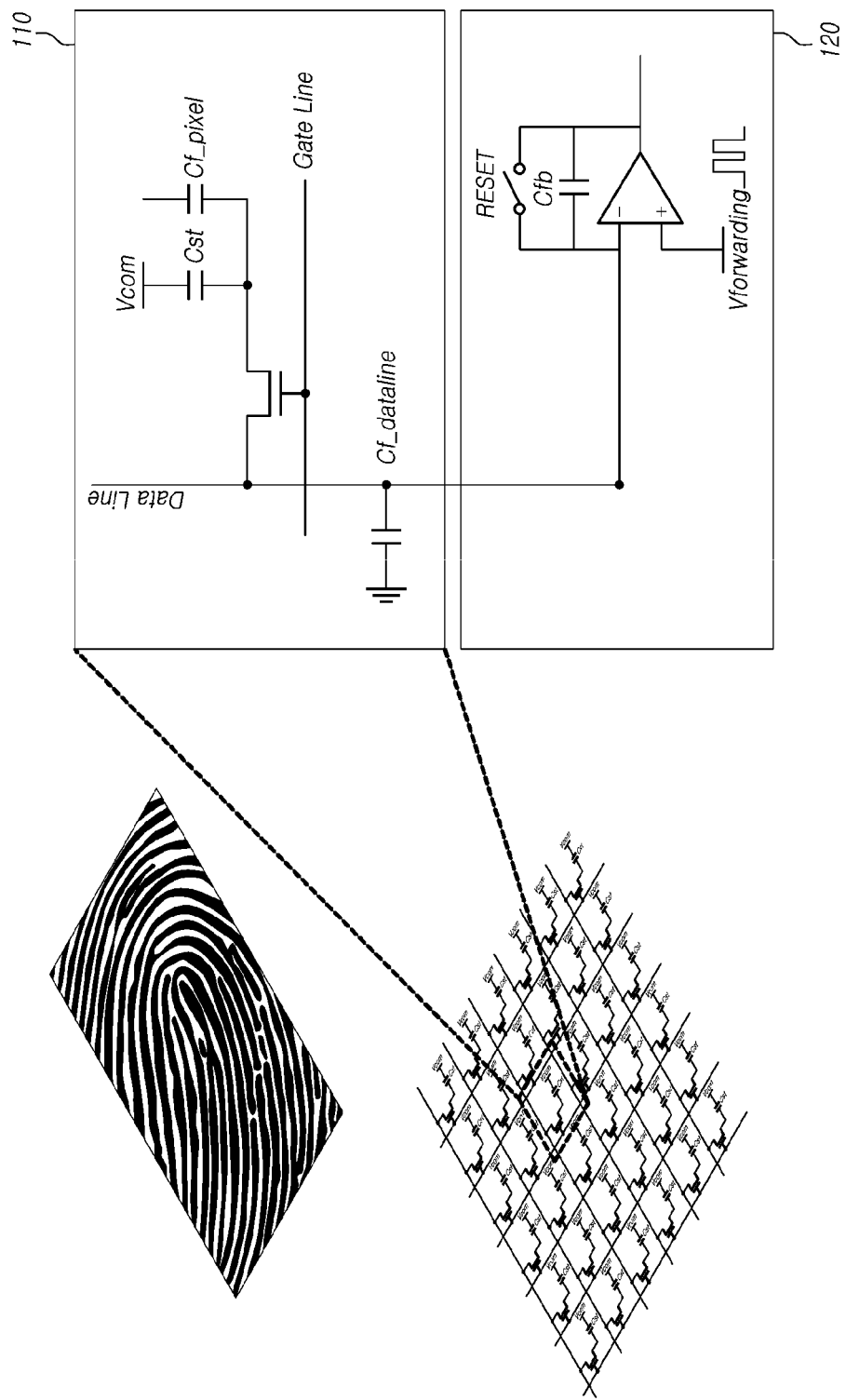
FIGS. 2 and 3 are views for illustrating a method of sensing a fingerprint touch by a touch display device according to the present embodiments.
Figure 3:
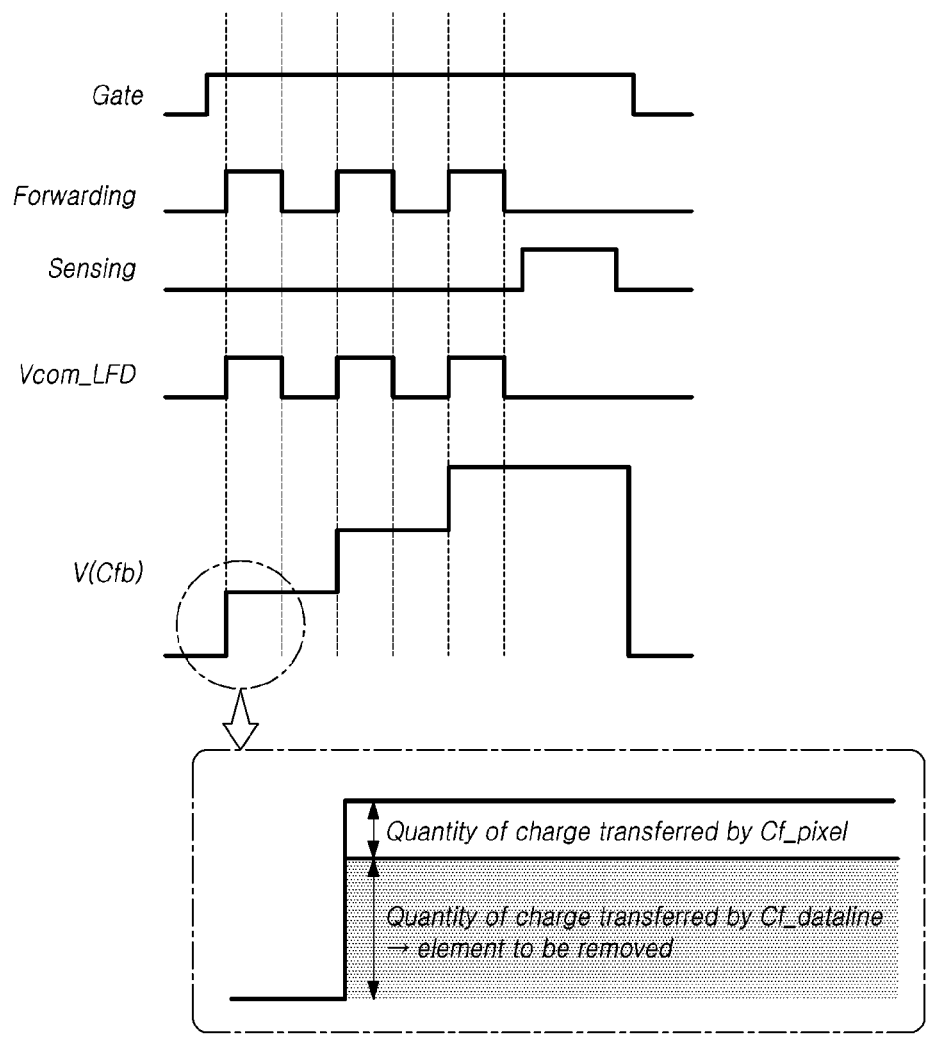

FIGS. 2 and 3 are views for illustrating a method in which a touch display device 100 senses a user's fingerprint touch, according to the present embodiments.

Referring to FIG. 2, the touch display device 100 according to the present embodiments includes: a pixel electrode disposed in the display panel 110; a data line electrically connected to the pixel electrode, wherein data voltage is applied to the data line in a display driving interval; and a switching transistor disposed between the pixel electrode and the data line and connecting them to each other.

The touch drive circuit 120 that senses a fingerprint touch includes an operational amplifier having a (−) terminal connected to the data line and a (+) terminal to which forwarding voltage is applied; and a capacitor Cfb connected to the operational amplifier.

In a fingerprint touch sensing interval, a scan signal is applied to a gate line to turn on the switching transistor, whereby voltage may be applied to the pixel electrode through the data line.

In a state where voltage may be applied to the pixel electrode, forwarding voltage Vforwarding is applied to sense a variance of capacitance between the pixel electrode and a fingerprint touching the display panel 110.

The touch drive circuit 120 senses a variance of capacitance between a fingerprint and a pixel electrode, so as to distinguish a peak and a valley of the fingerprint through a difference in the variance of the capacitance, and sense a fingerprint touch on the display panel 110.

A variance of capacitance, required when the touch drive circuit 120 senses the fingerprint touch is pixel capacitance Cf_pixel which corresponds to a variance of capacitance between the pixel electrode and the fingerprint. However, since forwarding voltage Vforwarding is applied to the pixel electrode through the data line, data line capacitance Cf_dataline which corresponds to a variance of capacitance between the data line and the fingerprint may be sensed together with the pixel capacitance Cf_pixel.

Therefore, a capacitance variance folioed in the data line is sensed together with the pixel capacitance Cf_pixel, whereby the distinction between a peak and a valley of the fingerprint is decreased.

FIG. 3 is a view illustrating timings of a voltage and a signal applied in the fingerprint touch sensing interval of the touch display device 100.

Referring to FIG. 3, in the fingerprint touch sensing interval, a scan signal is applied to the gate line, and therefore, the switching transistor disposed between the pixel electrode and the data line and connecting them to each other comes into an ON state.

Since the switching transistor is in the ON state, it is possible to apply voltage to the pixel electrode through the data line, and the touch drive circuit 120 applies forwarding voltage Vforwarding to the pixel electrode through the data line.

In an interval in which forwarding voltage Vforwarding is applied to the pixel electrode, load-free driving voltage which is the same as the forwarding voltage Vforwarding is applied to the common electrode.

An identical voltage to a voltage applied to the pixel electrode is applied to the common electrode, thereby preventing capacitance formed between the common electrode and the pixel electrode from affecting sensing of capacitance of the pixel electrode.

Forwarding voltage Vforwarding may be applied to the pixel electrode only one time. However, in order to improve accuracy in sensing, forwarding voltage Vforwarding may be applied many times.

That is, as illustrated in FIG. 3, forwarding voltage Vforwarding is applied to the pixel electrode three times, and a capacitance variance of the pixel electrode, which occurs whenever the forwarding voltage Vforwarding is applied, is stored in the capacitor Cfb.

When the capacitance variance of the pixel electrode, stored in the capacitor Cfb, is accumulated, the capacitance stored in the capacitor Cfb is sensed. Then, a peak and a valley of the fingerprint are distinguished by using the sensed capacitance, whereby a fingerprint touch may be sensed.

A capacitance variance required to sense a fingerprint touch corresponeds to a variance transferred by the pixel capacitance Cf_pixel. However, the variance transferred by the data line capacitance Cf_dataline has a larger value than the pixel capacitance Cf_pixel.

Therefore, a capacitance variance sensed in order to sense a fingerprint touch on the display panel 110, includes an unneccesary capacitance variance, so that there is a problem that the distinction between the peak and the valley of the fingerprint is decreased.

The present embodiments provides a touch display device 100 which removes a capacitance variance of the data line, sensed together with a capacitance variance of the pixel electrode when the capacitance variance of the pixel electrode is sensed in the fingerprint touch sensing interval, thereby enhancing the distinction between a peak and a valley of a fingerprint and improving a fingerprint touch sensing performance.

Figure 4:
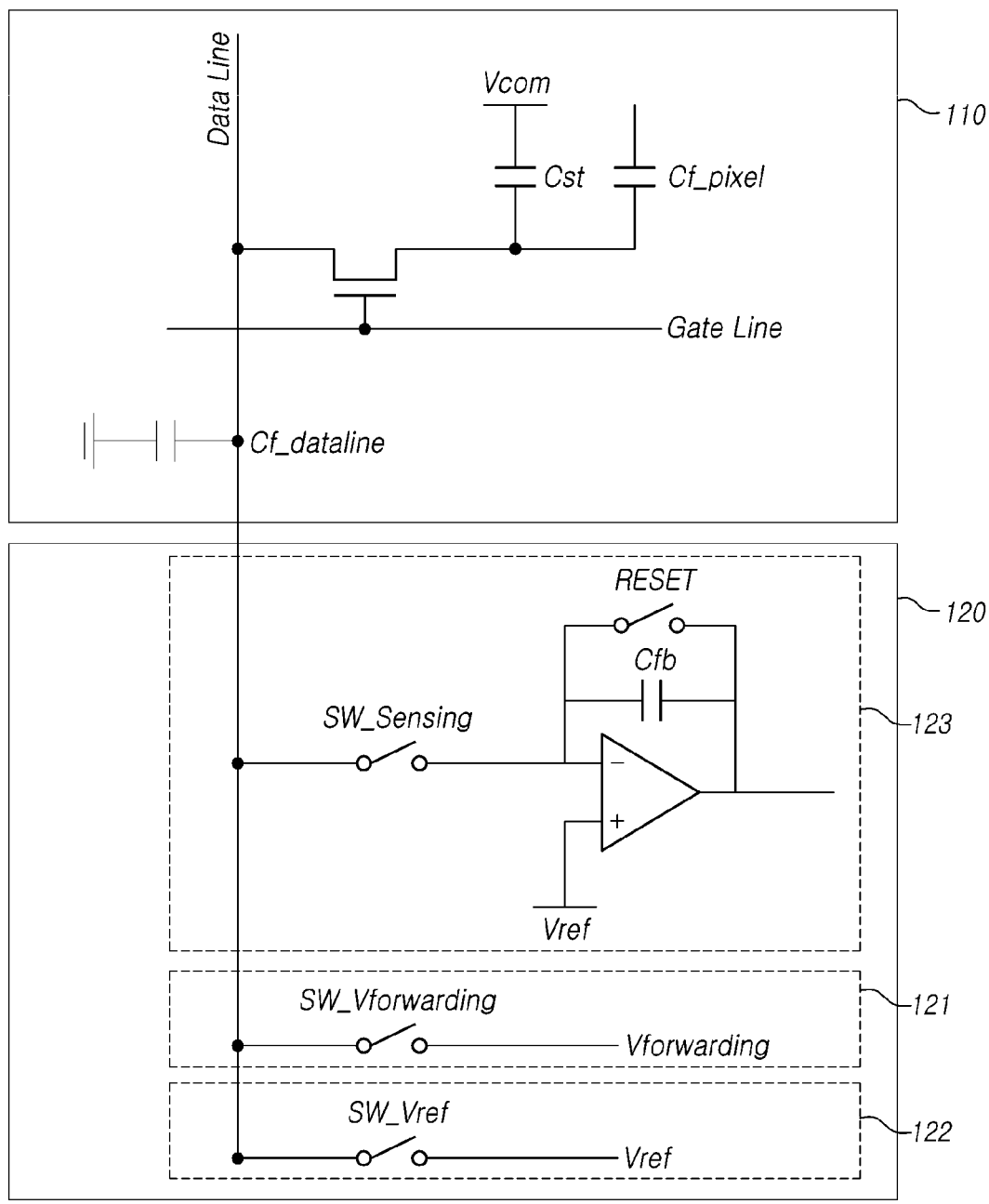
FIG. 4 is a view illustrating a structure in which a fingerprint touch is sensed by a touch display device according to the present embodiments.

FIG. 4 is a view illustrating a fingerprint touch sensing structure in which a capacitance variance of the data line can be removed and a fingerprint touch can be sensed in the touch display device 100 according to the present embodiments.

Referring to FIG. 4, a touch drive circuit 120 of the touch display device 100 capable of sensing a fingerprint touch according to the present embodiments includes a forwarding voltage applying unit 121, a reference voltage applying unit 122, and a fingerprint touch sensing unit 123.

The forwarding voltage applying unit 121 includes a forwarding voltage control switch SW_Vforwarding connected to the data line.

The forwarding voltage applying unit 121 controls such that the forwarding voltage control switch SW_Vforwarding is in an ON state in a first interval in which the switching transistor disposed between the pixel electrode and the data line and connecting them to each other is in an ON state within the fingerprint touch sensing interval.

Further, the forwarding voltage applying unit 121 controls such that the forwarding voltage control switch SW_Vforwarding is in an OFF state in a second interval and a third interval within the fingerprint touch sensing interval.

When the forwarding voltage control switch SW_Vforwarding is in an ON state, forwarding voltage Vforwarding is applied to the pixel electrode through the data line since the switching transistor disposed between the pixel electrode and the data line and connecting them to each other is in an ON state.

When a fingerprint touch is generated in a state where the forwarding voltage Vforwarding has been applied to the pixel electrode, capacitance of the pixel electrode is changed.

At this time, when a variance of the capacitance of the pixel electrode is sensed, a capacitance variance of the data line to which the forwarding voltage Vforwarding is applied is sensed together with the variance of the pixel electrode, so that the present embodiments provides an interval in which the voltage of the data line is controlled within the fingerprint touch sensing interval.

The controlling of the voltage of the data line is performed by the reference voltage applying unit 122 in the second interval within the fingerprint touch sensing interval.

The reference voltage applying unit 122 includes a reference voltage control switch SW_Vref connected to the data line.

The reference voltage applying unit 122 controls such that the reference voltage control switch SW_Vref is in an ON state in the second interval in which the switching transistor disposed between the pixel electrode and the data line and connecting them to each other is in an OFF state within the fingerprint touch sensing interval.

Further, the reference voltage applying unit 122 controls such that the reference voltage control switch SW_Vref is in an OFF state in the first interval and the third interval within the fingerprint touch sensing interval.

When forwarding voltage Vforwarding is applied in the first interval of the fingerprint touch sensing interval and the switching transistor enters into an OFF state in the second interval of the fingerprint touch sensing interval, the pixel electrode maintains a state where the forwarding voltage Vforwarding is applied thereto.

Meanwhile, the voltage of the data line to which the forwarding voltage Vforwarding is applied in the first interval of the fingerprint touch sensing interval is changed into reference voltage Vref applied in the second interval of the fingerprint touch sensing interval.

That is, reference voltage Vref is applied in a state where the switching transistor is in an OFF state in the second interval of the fingerprint touch sensing interval, so that the voltage of the pixel electrode is maintained at the forwarding voltage Vforwarding and the voltage of the data line is changed into the reference voltage Vref.

The fingerprint touch sensing unit 123 includes a sensing switch SW_Sensing connected to the data line, an operational amplifier having a (−) terminal connected to the sensing switch SW_Sensing and a (+) terminal to which reference voltage Vref is applied, and a capacitor Cfb connected to the operational amplifier in parallel.

The fingerprint touch sensing unit 123 controls such that the sensing switch SW_Sensing is in an ON state in the third interval in which the switching transistor is in an ON state within the fingerprint touch sensing interval.

The fingerprint touch sensing unit 123 controls such that the sensing switch SW_Sensing is in an OFF state in the first interval and the second interval within the fingerprint touch sensing interval, and the sensing switch SW_Sensing is in an ON state in the third interval, so that the fingerprint touch sensing unit 123 senses a capacitance variance of the pixel electrode, which occurs in the first interval and the second interval.

In the second interval, which is a preceding interval of the third interval, the voltage of the pixel electrode is maintained at the forwarding voltage Vforwarding and the voltage of the data line has been changed into the reference voltage Vref.

When the sensing switch SW_Sensing enters into an ON state in the third interval of the fingerprint touch sensing interval, a capacitance variance of only the pixel electrode having a voltage level different from reference voltage Vref applied to the (+) terminal of the operational amplifier is stored in the capacitor Cfb.

Further, the voltage of the data line has been fixed to be identical to the reference voltage Vref applied to the (+) terminal of the operational amplifier, so that there is no voltage difference. Accordingly, a capacitance variance of the data line is not transferred to the capacitor Cfb.

Therefore, a capacitance variance of the data line may be removed in a process of sensing a capacitance variance of the pixel electrode through the data line, so that it is possible to precisely sense a capacitance variance of the pixel electrode.

As a capacitance variance of the pixel electrode is precisely sensed, the distinction between a peak and a valley of a fingerprint touching the display panel 110 is enhanced, so that a fingerprint touch sensing performance can be improved.

Figure 5:
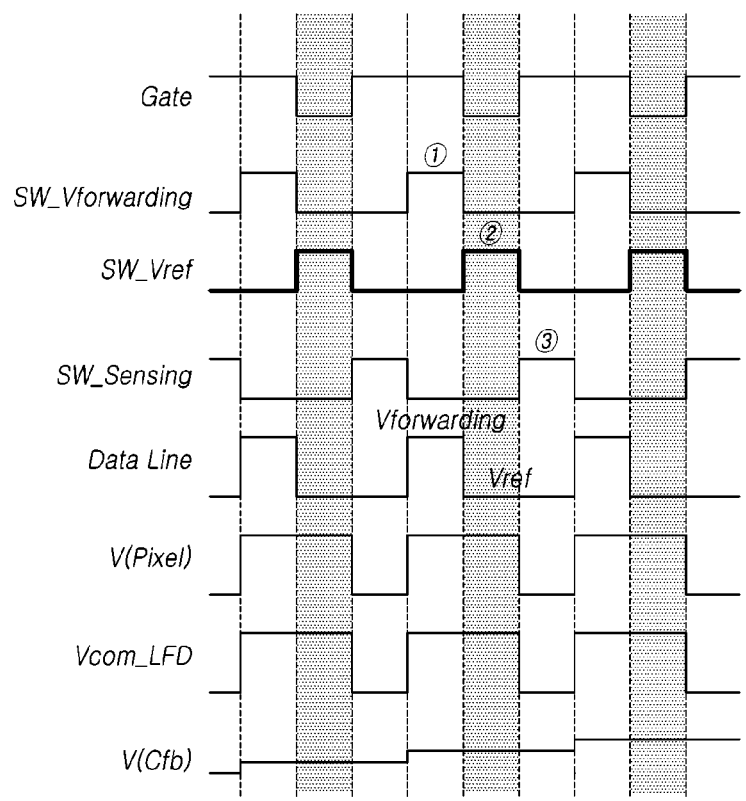
FIG. 5 is a view illustrating timings of a voltage and a signal applied when a fingerprint touch is sensed by a touch display device according to the present embodiments.

FIG. 5 is a view illustrating timings of a voltage and a signal applied in a fingerprint touch sensing interval of the touch display device 100 according to the present embodiments.

Referring to FIG. 5, the fingerprint touch sensing interval is divided into a first interval, a second interval, and a third interval. Further, a capacitance variance of the pixel electrode, stored in the capacitor Cfb is accumulated by repeating fingerprint touch sensing by a predetermined number of times, so that a fingerprint touch is sensed.

In the first interval of the fingerprint touch sensing interval, the switching transistor connecting the pixel electrode and the data line enters into an ON state, and the forwarding voltage control switch SW_Forwarding enters into an ON state.

At this time, the reference voltage contol switch SW_Vref and the sensing switch SW_Sensing maintain OFF states.

When the switching transistor and the forwarding voltage control switch SW_Forwarding enter into the ON states, the data line and the pixel electrode enter into a state where forwarding voltage Vforwarding is applied thereto.

Further, load-free driving voltage identical to the forwarding voltage Vforwarding is applied to the common electrode, thereby preventing capacitance formed between the common electrode and the pixel electrode from affecting sensing capacitance of the pixel electrode.

In the second interval of the fingerprint touch sensing interval, the switching transistor connecting the pixel electrode and the data line enters into an OFF state, and the reference voltage control switch SW_Vref enters into an ON state.

At this time, the forwarding voltage control switch SW_Vforwarding is changed into an OFF state, and the sensing switch SW_sensing maintains an OFF state.

In a state where the switching transistor is in an OFF state, the reference voltage control switch SW_Vref enters into an ON state. Therefore, the voltage of the pixel electrode is maintained at the forwarding voltage Vforwarding, and the voltage of the data line is changed into reference voltage Vref.

In the third interval of the fingerprint touch sensing interval, the switching transistor connecting the pixel electrode and the data line enters into an ON state, and the sensing switch SW_Sensing enters into an ON state.

When the sensing switch SW_Sensing enters into the ON state, a capacitance variance of the pixel electrode having a voltage level different from reference voltage Vref applied to the (+) terminal of the operational amplifier having the (−) terminal connected to the data line is transferred to the capacitor Cfb connected to the operational amplifier.

On the other hand, the voltage of the data line has been changed into the reference voltage Vref and thus is the same as the voltage of the (+) terminal of the operational amplifier. Therefore, a capacitance variance of the data line is not transferred to the capacitor Cfb connected to the operational amplifier.

Figure 6:
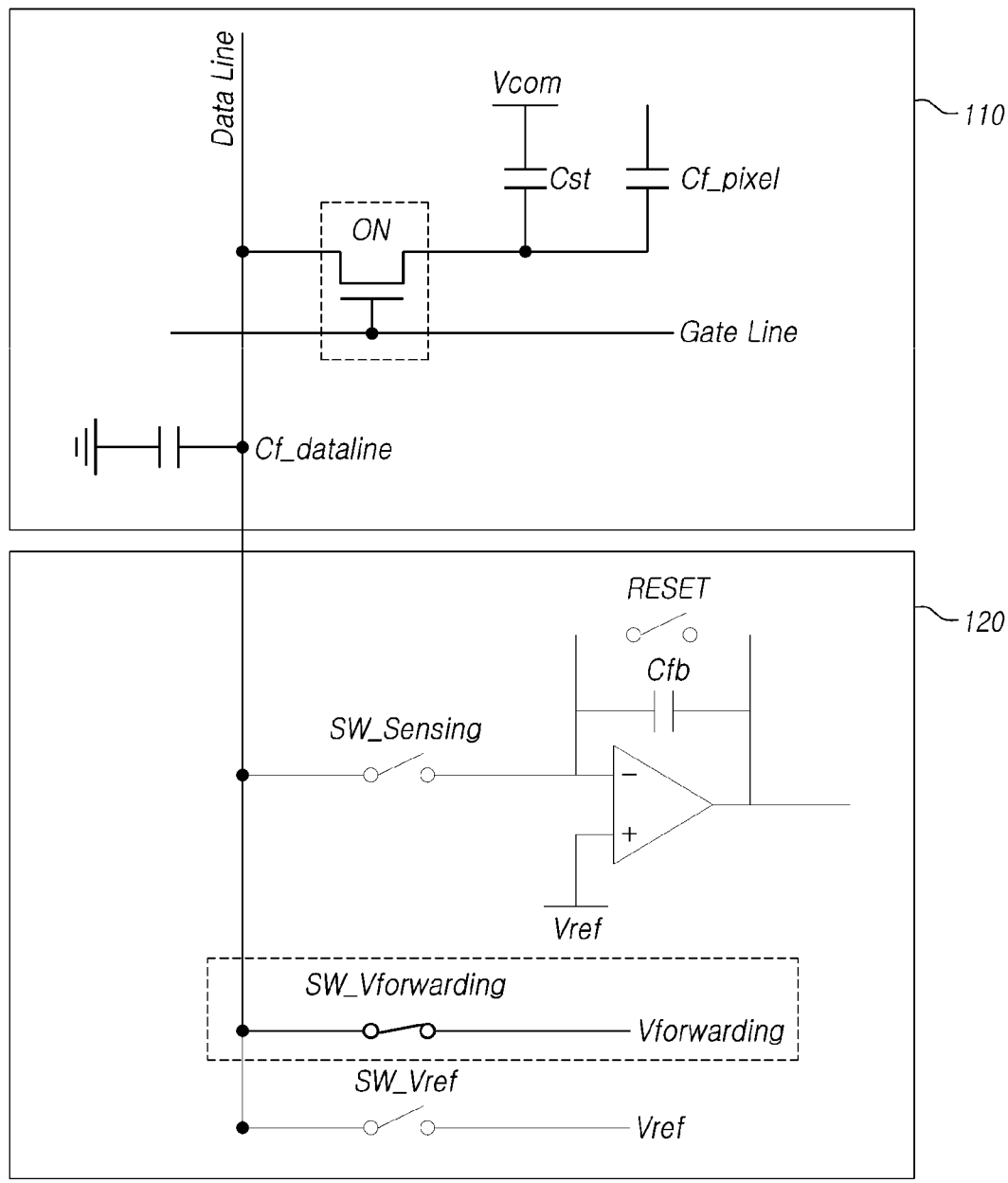
FIGS. 6 to 8 are views illustrating an operating state of each configuration during a process in which a fingerprint touch is sensed by a touch display device according to the present embodiments.
Figure 8:
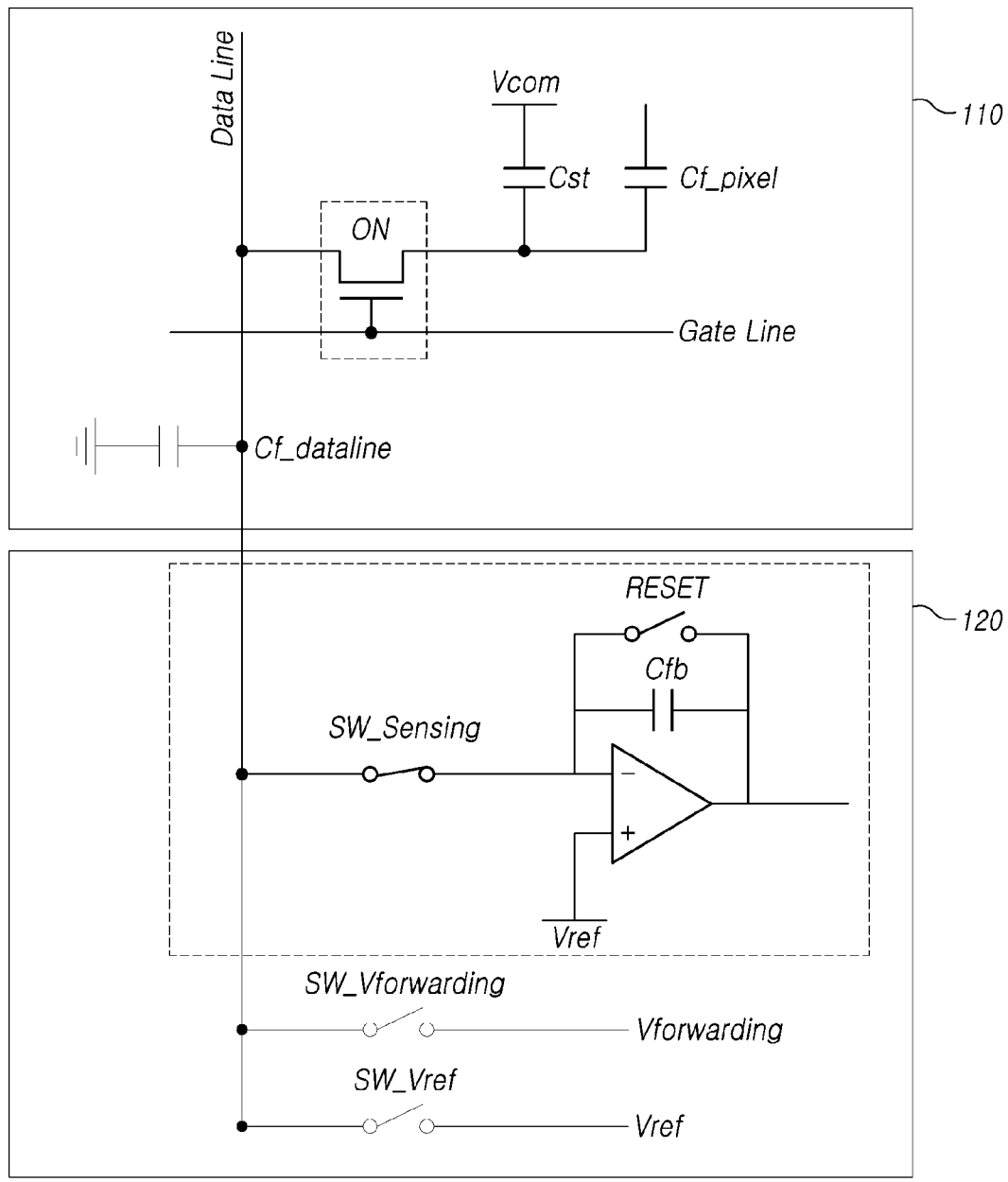

FIGS. 6 and 8 illustrate an operating state of each configuration in a process of sensing a fingerprint touch by the touch display device 100 according to the present embodiments.

FIG. 6 illustrates an operating state of each configuration in the first interval of the fingerprint touch sensing interval.

Referring to FIG. 6, in the first interval of the fingerprint touch sensing interval, the switching transistor which is arranged in the display penal 110 and connects the pixel electrode and the data line enters into an ON state.

Further, in the touch drive circuit 120, the reference voltage control switch SW_Vref and the sensing switch SW_Sensing maintain OFF states, and only the forwarding voltage control switch SW_Vforwarding enters into an ON state.

Therefore, the pixel electrode and the data line enters into a state where forwarding voltage Vforwarding is applied thereto.

Since the forwarding voltage Vforwarding has been applied to the pixel electrode, a change may occur in the capacitance of the pixel electrode according to a peak and a valley of the fingerprint. In addition, since the forwarding voltage Vforwarding has been applied to the data line, a change in the capacitance of the data line also occur.

Figure 7:
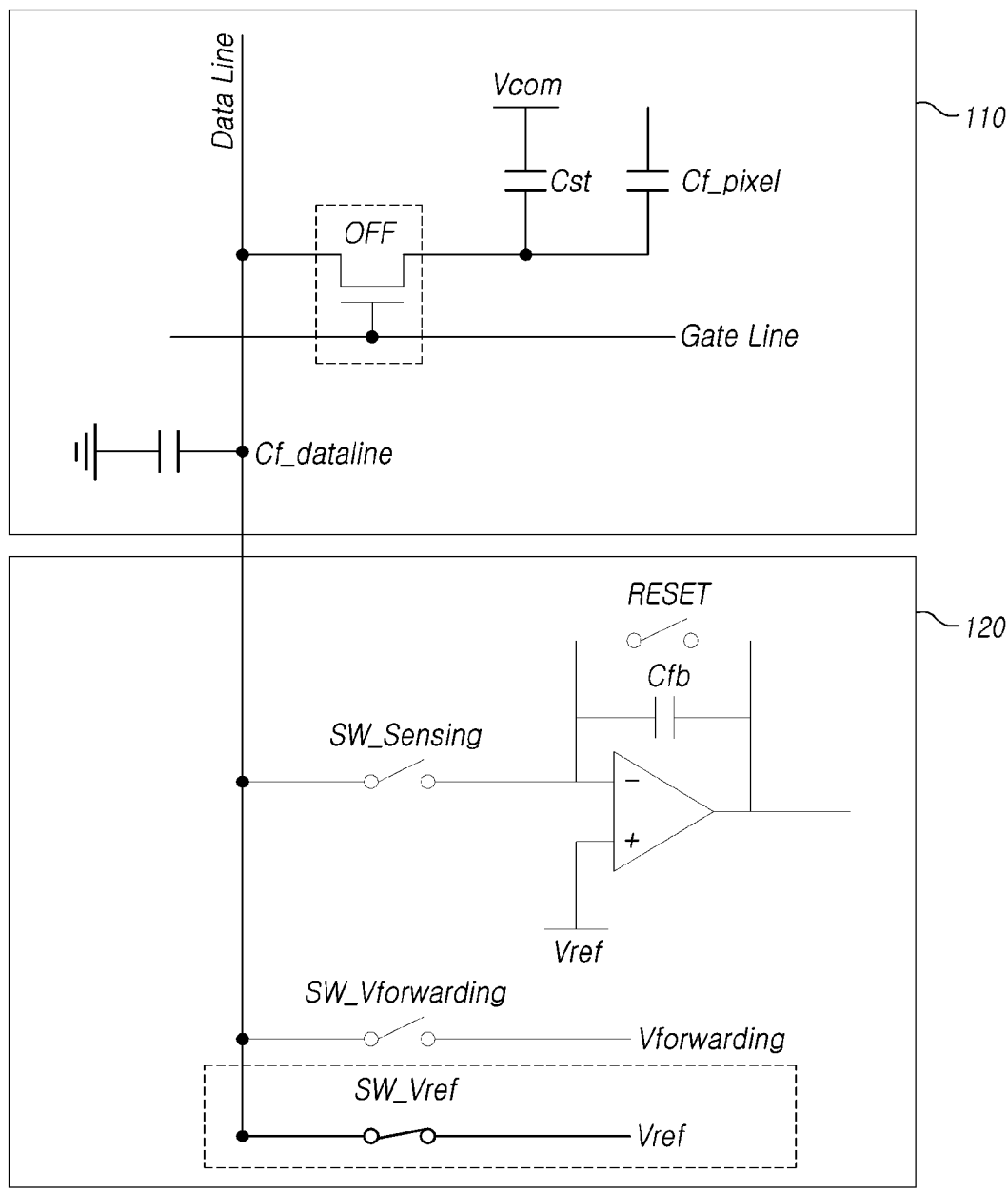

FIG. 7 illustrates an operating state of each configuration in the second interval of the fingerprint touch sensing interval.

Referring to FIG. 7, in the second interval of the fingerprint touch sensing interval, the switching transistor connecting the pixel electrode and the data line enters into an OFF state.

Since the switching transistor enters into the OFF state, the voltage of the pixel electrode is fixed to be forwarding voltage Vforwarding that has been applied in the first interval.

Further, in the touch drive circuit 120, the forwarding voltage control switch SW_Vforwarding and the sensing switch SW_Sensing maintain OFF states, and only the reference voltage control switch SW_Vref enters into an ON state.

Since the reference voltage control switch SW_Vref enters into the ON state, the voltage of the data line is changed into reference voltage Vref from the forwarding voltage Vforwarding that has been applied in the first interval.

At this time, the reference voltage Vref is the same as the voltage applied to the (+) terminal of the operational amplifier that senses a capacitance variance of the pixel electrode.

That is, the voltage of the data line to which the forwarding voltage Vforwarding is applied in the first interval is changed into the reference voltage Vref applied to the (+) terminal of the operational amplifier, whereby, later, when a capacitance variance of the pixel electrode is sensed, a capacitance variance of the data line may not be sensed by the operational amplifier.

FIG. 8 illustrates an operating state of each configuration in the third interval of the fingerprint touch sensing interval.

Referring to FIG. 8, the switching transistor disposed between the pixel electrode and the data line and connecting them to each other enters into an ON state in the third interval of the fingerprint touch sensing interval.

Further, in the touch drive circuit 120, the forwarding voltage control switch SW_Vforwarding and the reference voltage control switch SW_Vref maintain OFF states, and only the sensing switch SW_Sensing enters into an ON state.

As the switching transistor enters into the ON state, the voltage of the pixel electrode is changed into reference voltage Vref, which is the voltage of the data line, from the forwarding voltage Vforwarding. Then, by a voltage difference resulting therefrom, a capacitance variance of the pixel electrode is transferred to the capacitor Cfb connected to the operational amplifier.

On the other hand, the voltage of the data line has been changed into the reference voltage Vref in the second interval. Therefore, there is no voltage difference between the (−) terminal and the (+) terminal of the operational amplifier, so that a capacitance variance of the data line is not transferred to the capacitor Cfb.

Therefore, in the third interval of the fingerprint touch sensing interval, a capacitance variance of only the pixel electrode, occurring in the first interval and the second interval, is sensed, so that sensed data from which a capacitance variance of the data line is removed may be obtained.

A capacitance variance of only a pixel electrode having information on a peak and a valley of a fingerprint occuring on the pixel electrode, is transferred to the capacitor Cfb, whereby the distinction between a peak and a valley during fingerprint touch sensing can be enhanced and a fingerprint touch sensing performance can be improved.

Meanwhile, in the touch drive circuit 120, the forwarding voltage applying unit 121 and the reference voltage applying unit 122 which controls voltage applying may be arranged in the touch drive circuit 120, but may be arranged while being separated from the fingerprint touch sensing unit 123 arranged in the touch drive circuit 120, as needed.

Figure 9:
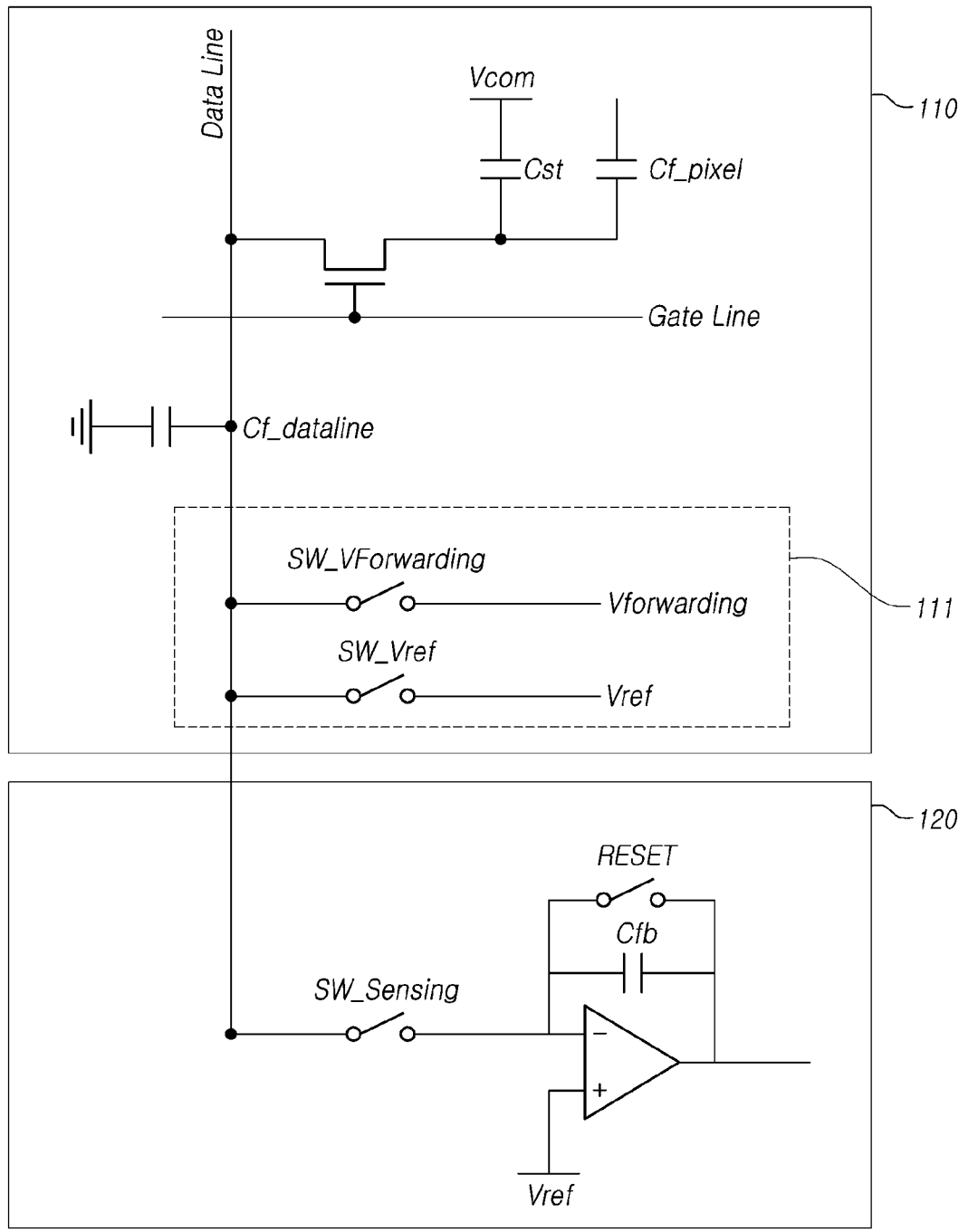
FIGS. 9 and 10 are views illustrating another structure in which a fingerprint touch is sensed by a touch display device according to the present embodiments.
Figure 10:
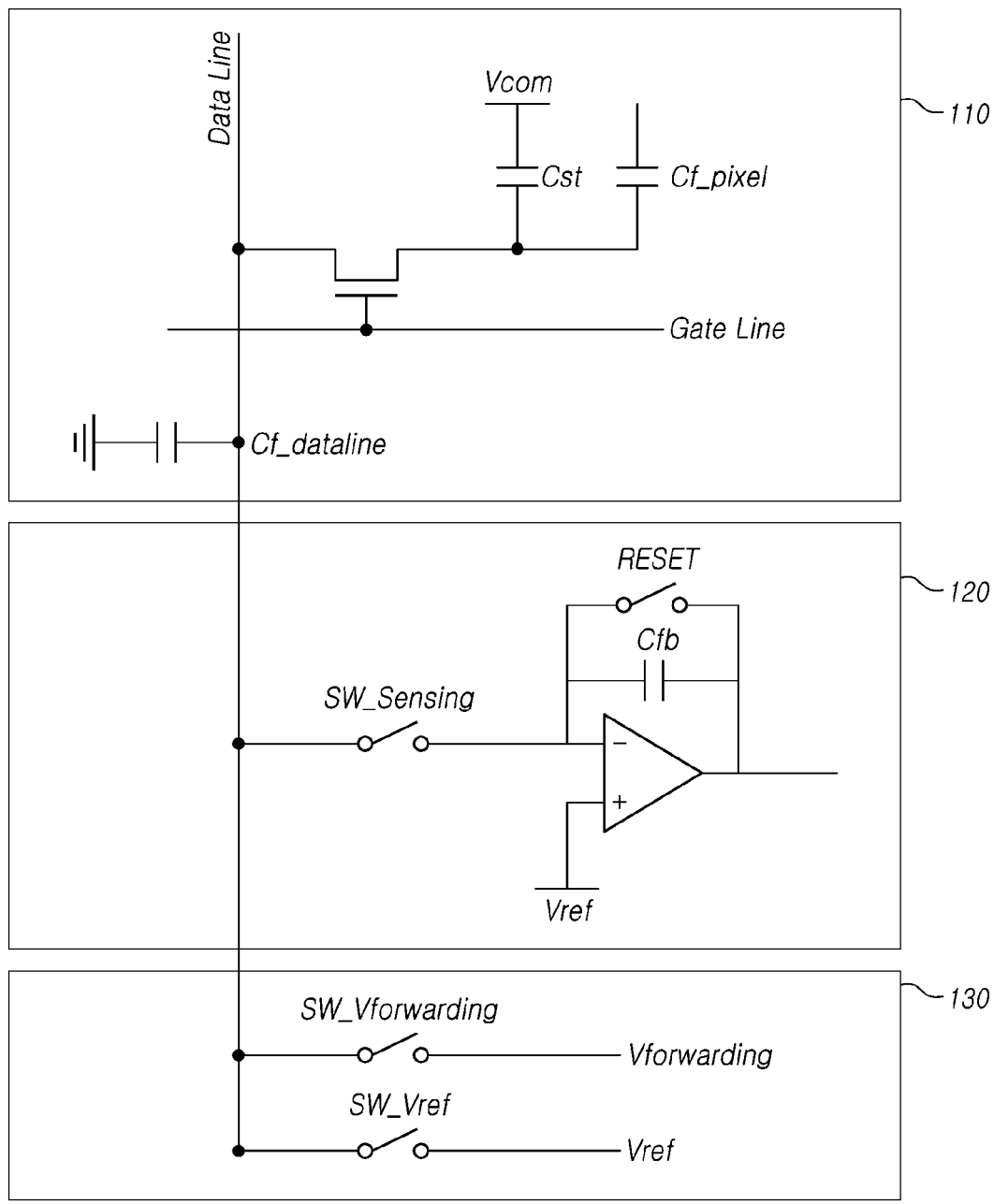

FIGS. 9 and 10 illustrate another embodiment of a fingerprint touch sensing structure of the touch display device 100 according to the present embodiments.

Referring to FIG. 9, the forwarding voltage applying unit 121 that controls applying of forwarding voltage Vforwarding and the reference voltage applying unit 122 that controls applying of reference voltage Vref may be arranged in the display panel 110.

In addition, as illustrated in FIG. 10, the forwarding voltage applying unit 121 and the reference voltage applying unit 122 may be arranged while being separated from the display panel 110 and the touch drive circuit 120.

When being arranged at the outside of the display panel 110 and the touch drive circuit 120, the forwarding voltage applying unit 121 and the reference voltage applying unit 122 may be arranged in a printed circuit substrate or a flexible printed circuit.

Therefore, since the forwarding voltage applying unit 121 and the reference voltage applying unit 122 may be arranged at the inside or outside of the touch drive circuit 120, so that a fingerprint touch sensing structure may be variously configured as needed.

Figure 11:
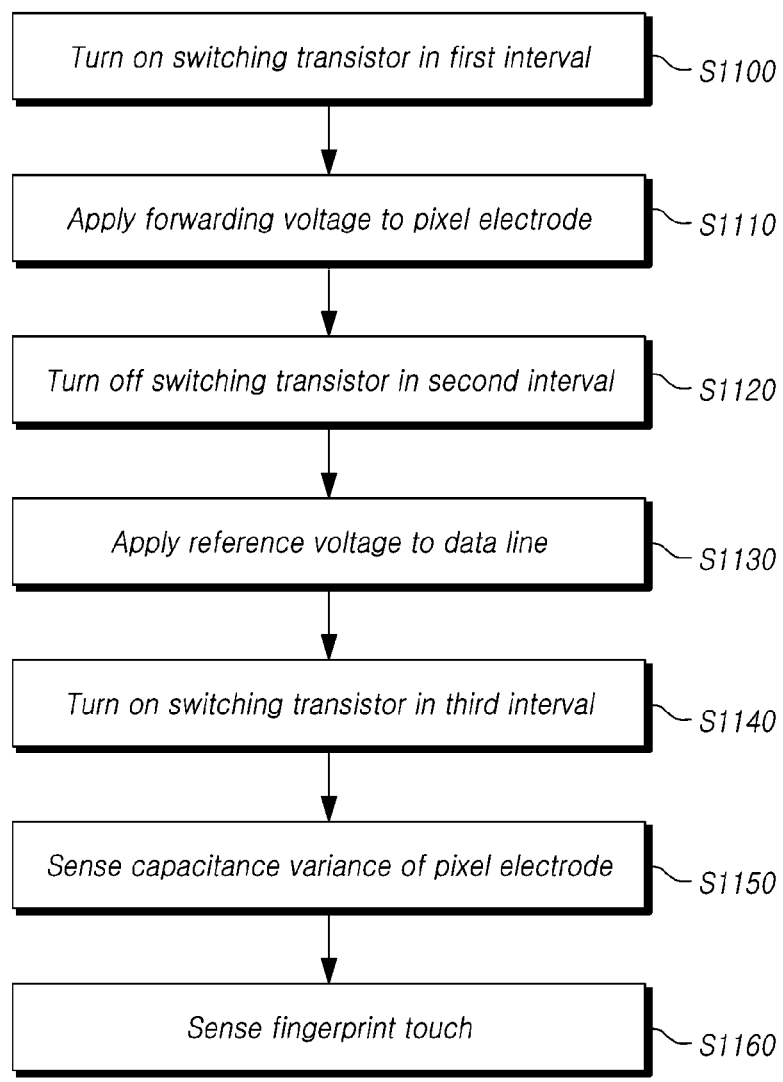
FIG. 11 is a view illustrating processes of a method for driving a touch display device according to the present embodiments.

FIG. 11 illustates a process of sensing a fingerprint touch by the touch display device 100 according to the present embodiments.

Referring to FIG. 11, the touch display device 100 according to the present embodiments turns on the switching transistor disposed between the pixel electrode and the data line and connecting them to each other in the first interval of the fingerprint touch sensing interval, in step S1100.

The touch display device 100 allows forwarding voltage Vforwarding to be applied to the pixel electrode through the data line in a state where the switching transistor is turned on, in step S1110.

The touch display device 100 turns off the switching transistor disposed between the pixel electrode and the data line and connecting them to each other in the second interval of the fingerprint touch sensing interval, in step S1120, and applies reference voltage Vref to the data line, in step S1130.

Therefore, the touch display device 100 allows the voltage of the pixel electrode to be maintained at the forwarding voltage Vforwarding, and allows the voltage of the data line to be changed into reference voltage Vref.

The touch display device 100 turns on the switching transistor in the third interval of the fingerprint touch sensing interval, in step S1140.

The touch display device 100 turns on the switching transistor in a state where the voltage of the data line is fixed to be the reference voltage Vref, so that a capacitance variance of the pixel electrode is transferred to the fingerprint touch sensing unit 123 according to a change in voltage of the pixel electrode.

Therefore, the fingerprint touch sensing unit 123 senses the capacitance variance of the pixel electrode, in step S1150, and senses a fingerprint touch by using the sensed capacitance variance of the pixel electrode, in step S1160.

Accoridng to the present embodiments, before a capacitance variance of the pixel electrode in the fingerprint touch sensing interval is sensed, the voltage of only the data line is changed to be the reference voltage Vref applied to the (+) terminal of the operational amplifier of the fingerprint touch sensing unit 123, so that a capacitance variance of the data line is not sensed.

Therefore, provided is a touch display device 100 which can sense a capacitance variance of only the pixel electrode, thereby enhancing the distinction between a peak and a valley of a fingerprint touching the display panel 110, and improving a fingerprint touch sensing performance.

It will be apparent to those skilled in the art that various modifications and variations can be made in the touch drive circuit, the touch display device, and the method for driving the touch display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a plurality of pixel electrodes disposed in a display panel;
a plurality of common electrodes disposed in the display panel;
a data line disposed in the display panel and electrically connected to pixel electrodes;
a switching transistor disposed between the data line and a pixel electrode and connecting the data line and the pixel electrode;
a voltage applying unit configured to apply forwarding voltage to the pixel electrode through the data line in a first interval in which the switching transistor is in an ON state within a fingerprint touch sensing interval, and apply reference voltage to the data line in a second interval in which the switching transistor is in an OFF state; and
a fingerprint touch sensing unit configured to sense a capacitance variance of the pixel electrode in a third interval in which the switching transistor is in an ON state within the fingerprint touch sensing interval,
wherein a touch drive signal is applied to at least one of the plurality of common electrodes in a touch drive interval, and an identical voltage to the forwarding voltage is applied to at least one of the plurality of common electrodes in the first interval and the second interval within the fingerprint touch sensing interval; and
wherein the first, second, and third intervals of the fingerprint touch sensing interval are directly sequential,
wherein the reference voltage is applied to the data line during an entirety of the second interval.

2. The touch display device of claim 1, wherein the fingerprint touch sensing unit comprises:
a sensing switch connected to the data line;
an operational amplifier having an invert input (−) terminal connected to the sensing switch and a non-invert input (+) terminal to which the reference voltage is applied; and
a capacitor connected to the operational amplifier in parallel.

3. The touch display device of claim 2, wherein the sensing switch is configured to be in an OFF state in the first interval and the second interval within the fingerprint touch sensing interval and to be in an ON state in the third interval within the fingerprint touch sensing interval.

4. The touch display device of claim 3, wherein, in the ON state of the sensing switch, the operational amplifier is configured to sense a capacitance variance of the pixel electrode having a voltage level different from the reference voltage applied to the (+) terminal and store the capacitance variance in a capacitor.

5. The touch display device of claim 1, wherein the voltage applying unit comprises:

a forwarding voltage control switch disposed between the data line and an input terminal for the forwarding voltage and connecting the data line and the input terminal for the forwarding voltage; and a reference voltage control switch disposed between the data line and an input terminal for the reference voltage and connecting the data line and the input terminal for the reference voltage.

6. The touch display device of claim 5, wherein, during the first interval, the forwarding voltage control switch is configured to be in an ON state and the reference voltage control switch is configured to be in an OFF state; and, during the second interval, the forwarding voltage control switch is configured to be in an OFF state and the reference voltage control switch is configured to be in an ON state.

7. The touch display device of claim 1, wherein the fingerprint touch sensing unit is configured to accumulate by a predetermined number of times a capacitance variance of the pixel electrode, sensed in the third interval within the fingerprint touch sensing interval, analyze a peak and a valley of a fingerprint by using the accumulated capacitance variance, and sense a fingerprint touch.

8. The touch display device of claim 1, wherein the voltage applying unit is disposed in the display panel, and the fingerprint touch sensing unit is disposed in a touch drive circuit of the touch display device.

9. The touch display device of claim 1, wherein the voltage applying unit and the fingerprint touch sensing unit is disposed in a touch drive circuit of the touch display device.

10. The touch display device of claim 1, wherein the voltage applying unit is disposed at the outside of display panel and a touch drive circuit of the touch display device, and the fingerprint touch sensing unit is disposed in the touch drive circuit.

11. The touch display device of claim 1, wherein each of the plurality of pixel electrodes has a size smaller than each of the plurality of common electrodes.

12. The touch display device of claim 1, wherein the touch drive signal and the identical voltage to the forwarding voltage are applied to the plurality of common electrodes through touch wires which are different from the data line.

13. The touch display device of claim 1, wherein:
the capacitance variance of the pixel electrode is sensed through the data line in the third interval within the fingerprint touch sensing interval; and
a capacitance variance of the common electrode is sensed through a touch wire which is different from the data line in the touch drive interval.

14. A method for driving a touch display device, comprising:
in a first interval, turning on a switching transistor which is disposed between a data line and a pixel electrode and connects the data line and the pixel electrode and applying forwarding voltage to the pixel electrode through the data line;
in a second interval, turning off the switching transistor and applying reference voltage to the data line; and
in a third interval, turning on the switching transistor and sensing a capacitance variance of the pixel electrode for fingerprint touch sensing,
wherein a touch drive signal is applied to a common electrode in a touch drive interval, and an identical voltage to the forwarding voltage is applied to the common electrode in the first interval and the second interval; and wherein the first, second, and third intervals are directly sequential,
wherein the reference voltage is applied to the data line during an entirety of the second interval.

15. The method of claim 14, wherein the reference voltage applied to the data line in the second interval is identical to a voltage which is applied to an invert input (+) terminal of an operational amplifier having a non-invert input (−) terminal connected to the data line, in order to sense a capacitance variance of the pixel electrode in the third interval.

16. The method of claim 14, further comprising:
accumulating the capacitance variance of the pixel electrode, sensed in the third interval; and
analyzing a peak and a valley of a fingerprint by using the accumulated capacitance variance of the pixel electrode and sensing a fingerprint touch.

17. A touch drive circuit, comprising:
a forwarding voltage applying unit configured to apply forwarding voltage to a pixel electrode through a data line in a first interval in which a switching transistor disposed between the data line and the pixel electrode and connecting the data line and the pixel electrode is in an ON state within a fingerprint touch sensing interval;
a reference voltage applying unit configured to apply reference voltage to the data line in a second interval in which the switching transistor is in an OFF state within the fingerprint touch sensing interval; and
a fingerprint touch sensing unit configured to sense a capacitance variance of the pixel electrode in a third interval in which the switching transistor is in an ON state within the fingerprint touch sensing interval,
wherein a touch drive signal is applied to a common electrode in a touch drive interval, and an identical voltage to the forwarding voltage is applied to the common electrode in the first interval and the second interval within the fingerprint touch sensing interval; and
wherein the first, second, and third intervals of the fingerprint touch sensing interval are directly sequential,
wherein the reference voltage is applied to the data line during an entirety of the second interval.

18. The touch drive circuit of claim 17, wherein the fingerprint touch sensing unit comprises: a sensing switch connected to the data line; an operational amplifier having an invert input (−) terminal connected to the sensing switch and an non-invert input (+) terminal to which the reference voltage is applied; and a capacitor connected to the operational amplifier in parallel.

19. The touch drive circuit of claim 18, wherein the sensing switch is configured to be in an ON state in the third interval and to be in an OFF state in the first interval and the second interval.

20. The touch drive circuit of claim 18, wherein the fingerprint touch sensing unit is configured to sense, in an ON state of the sensing switch, a capacitance variance of the pixel electrode having a voltage level different from the reference voltage applied to the (+) terminal of the operational amplifier.

21. The touch drive circuit of claim 17, wherein the fingerprint touch sensing unit is configured to accumulate by a predetermined number of times a capacitance variance of the pixel electrode, sensed in the third interval, analyze a peak and a valley of a fingerprint by using the capacitance variance of the pixel electrode, and sense a fingerprint touch.

22. The touch drive circuit of claim 17,
wherein the forwarding voltage applying unit comprises a forwarding voltage control switch disposed between the data line and an input terminal for the forwarding voltage and connecting the data line and the input terminal for the forwarding voltage; and
the forwarding voltage control switch is configured to be in an ON state in the first interval and to be in an OFF state in the second interval and the third interval.

23. The touch drive circuit of claim 17,
wherein the reference voltage applying unit comprises a reference voltage control switch disposed between the data line and an input terminal for the reference voltage and connecting the data line and the input terminal for the reference voltage; and
the reference voltage control switch is configured to be in an ON state in the second interval and to be in an OFF state in the first interval and the third interval.

* * * * *